United States Patent
Lin

(10) Patent No.: US 9,063,281 B2
(45) Date of Patent: Jun. 23, 2015

(54) OPTICAL CONNECTOR

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 234 days.

(21) Appl. No.: 13/744,383

(22) Filed: Jan. 17, 2013

(65) Prior Publication Data

US 2014/0079352 A1 Mar. 20, 2014

(30) Foreign Application Priority Data

Sep. 14, 2012 (TW) .............................. 101133595 A

(51) Int. Cl.
G02B 6/12 (2006.01)
G02B 6/42 (2006.01)
G02B 6/32 (2006.01)

(52) U.S. Cl.
CPC .......... *G02B 6/12002* (2013.01); *G02B 6/4286* (2013.01); *G02B 6/428* (2013.01); *G02B 6/32* (2013.01); *G02B 6/4214* (2013.01)

(58) Field of Classification Search
None
See application file for complete search history.

(56) References Cited

U.S. PATENT DOCUMENTS

| 5,898,803 | A * | 4/1999 | Mueller-Fiedler et al. | 385/36 |
|---|---|---|---|---|
| 6,198,864 | B1 * | 3/2001 | Lemoff et al. | 385/47 |
| 6,328,484 | B1 * | 12/2001 | Uebbing | 385/93 |
| 6,488,417 | B2 * | 12/2002 | Kropp | 385/88 |
| 6,491,447 | B2 * | 12/2002 | Aihara | 385/92 |
| 6,722,793 | B2 * | 4/2004 | Althaus et al. | 385/92 |
| 6,731,882 | B1 * | 5/2004 | Althaus et al. | 398/139 |
| 6,936,403 | B2 * | 8/2005 | Maekawa et al. | 430/270.16 |
| 6,939,058 | B2 * | 9/2005 | Gurevich et al. | 385/93 |
| 7,118,293 | B2 * | 10/2006 | Nagasaka et al. | 385/89 |
| 7,300,217 | B2 * | 11/2007 | Mizoguchi | 385/92 |
| 7,341,384 | B2 * | 3/2008 | Chan et al. | 385/89 |
| 7,359,590 | B2 * | 4/2008 | Hsu | 385/14 |
| 7,364,368 | B2 * | 4/2008 | Kropp | 385/89 |
| 7,539,367 | B2 * | 5/2009 | Tamura et al. | 385/14 |
| 7,556,440 | B2 * | 7/2009 | Birincioglu et al. | 385/93 |
| 7,630,593 | B2 * | 12/2009 | Furuno et al. | 385/14 |
| 7,729,569 | B2 * | 6/2010 | Beer et al. | 385/14 |
| 7,918,610 | B2 * | 4/2011 | Fujiwara et al. | 385/88 |
| 8,335,411 | B2 * | 12/2012 | Kuznia et al. | 385/33 |
| 8,478,094 | B2 * | 7/2013 | Hsu | 385/47 |
| 8,483,571 | B2 * | 7/2013 | McColloch et al. | 398/141 |
| 8,641,293 | B2 * | 2/2014 | Lin et al. | 385/77 |
| 2004/0033016 | A1 * | 2/2004 | Kropp | 385/31 |
| 2004/0202477 | A1 * | 10/2004 | Nagasaka et al. | 398/138 |
| 2006/0133718 | A1 * | 6/2006 | Liu | 385/14 |
| 2006/0210225 | A1 * | 9/2006 | Fujiwara et al. | 385/92 |

* cited by examiner

*Primary Examiner* — Tina Wong
(74) *Attorney, Agent, or Firm* — Novak Druce Connolly Bove + Quigg LLP

(57) ABSTRACT

An optical connector includes a substrate, a light emitter, a case, an optical fiber, and a photo detector. The light emitter, the case, and the photo detector are positioned on the substrate, and the case covers the light emitter and the photo detector. The case defines a first slot and a second slot. The first slot is configured for splitting a light beam of the light emitter into a part transmitting to the optical fiber for data transmission and another part to a side surface of the second slot and directed to the photo detector for intensive and stability measurement of the light beam.

11 Claims, 3 Drawing Sheets

OPTICAL CONNECTOR

BACKGROUND

1. Technical Field

The present disclosure relates to an optical connector.

2. Description of Related Art

Optical connectors modulate and transmit data on light beams. To ensure transmission quality, the intensity and stability of the light beams should be sufficient. However, it is difficult or inconvenient to determine if the intensity and stability is satisfactory.

Therefore, it is desirable to provide an optical connector, which can overcome the above-mentioned problems.

BRIEF DESCRIPTION OF THE DRAWINGS

Many aspects of the present disclosure can be better understood with reference to the following drawings. The components in the drawing are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
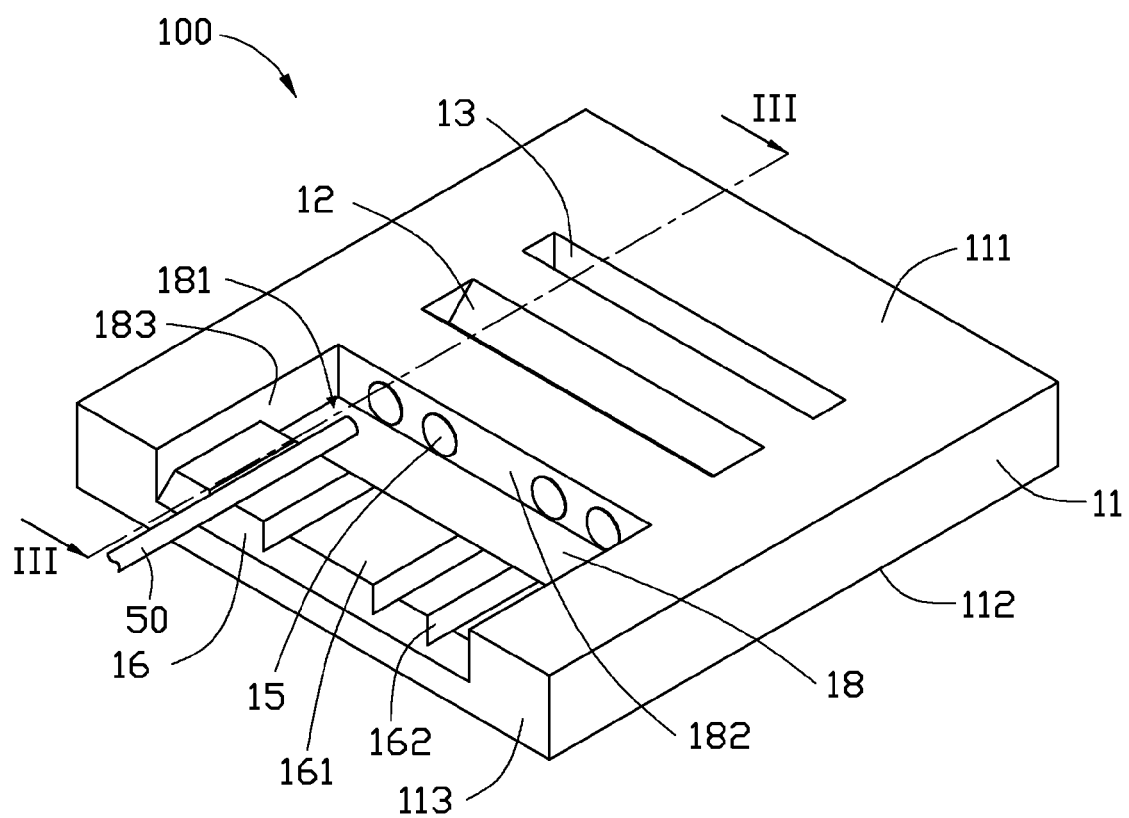
FIG. 1 is an isometric schematic view of an optical connector, according to an embodiment.
Figure 2:
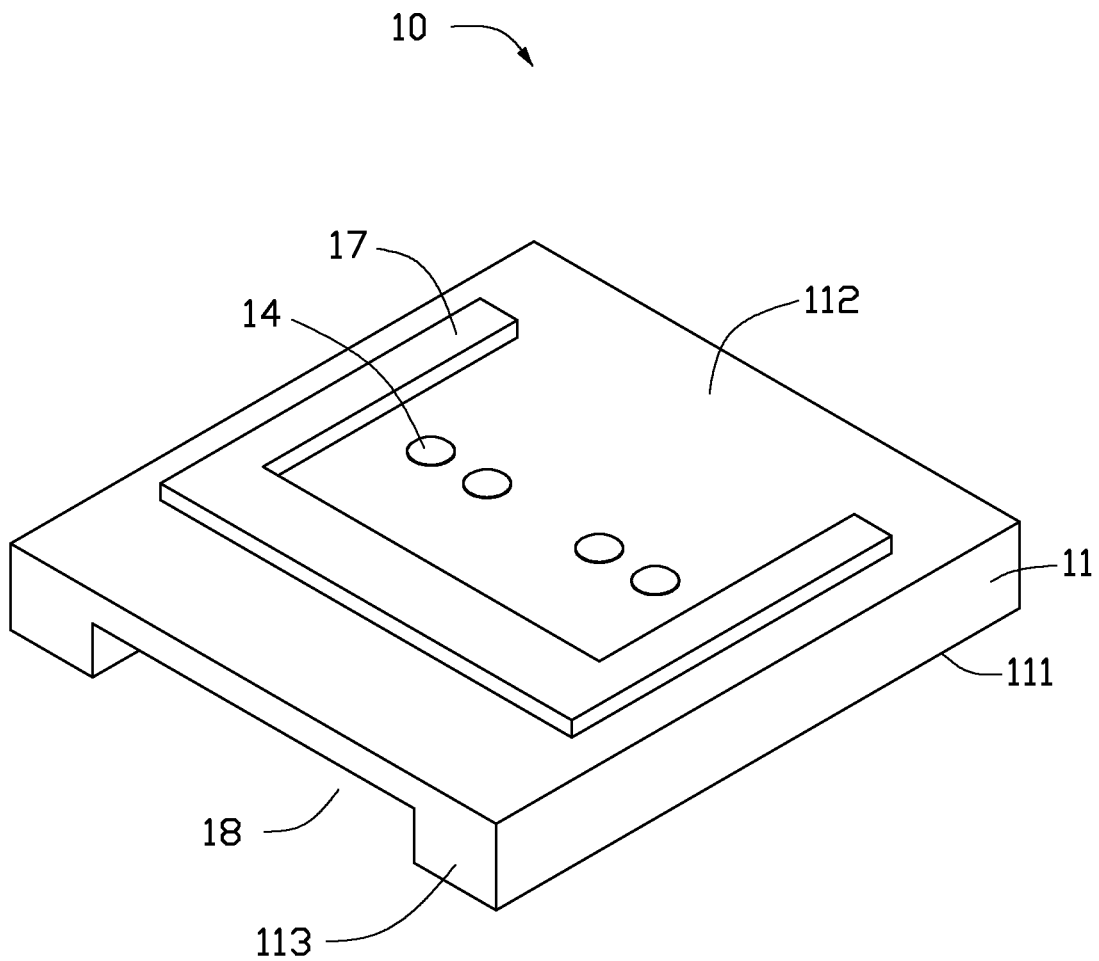
FIG. 2 is an isometric schematic view of a case of the optical connector of FIG. 1, viewed from another angle.
Figure 3:
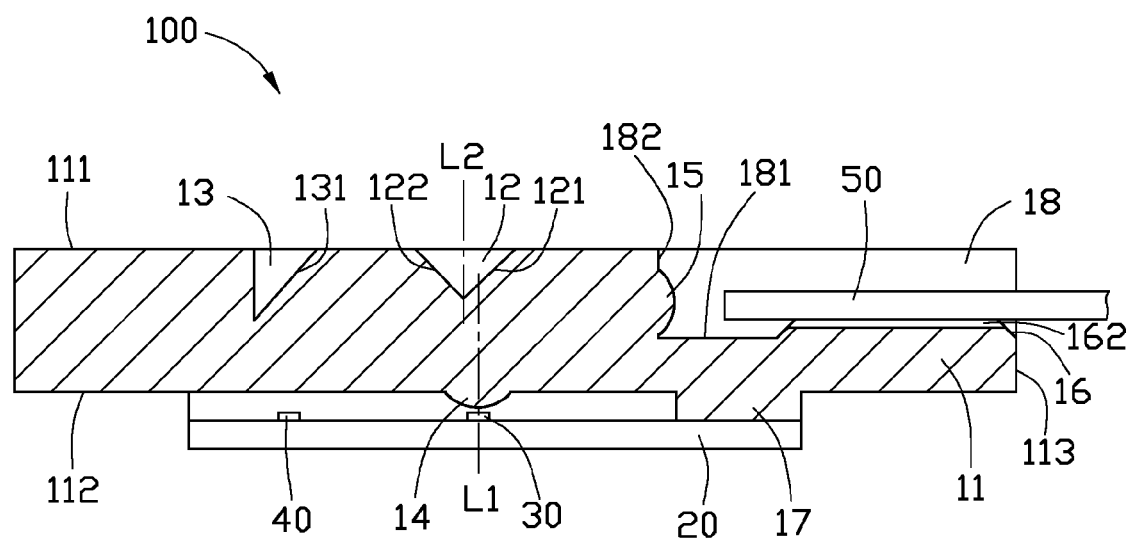
FIG. 3 is a cross-sectional schematic view taken along a line III-III of FIG. 1.

FIGS. 1-3 show an optical connector 100 in accordance with an embodiment of this disclosure. The optical connector 100 includes a transparent case 11, a substrate 20, a number of light emitters 30, and a number of photo detectors 40, and a number of optical fibers 50.

The case 11 is substantially a rectangular block and includes a first surface 111 (i.e., an upper surface as shown in FIGS. 1, 3), a second surface 112 (i.e., a lower surface as shown in FIGS. 1, 3) opposite to the first surface 111, and a third surface 113 (i.e., a front surface as shown in FIGS. 1, 3) perpendicularly connecting the first surface 111 to the second surface 112.

The case 11 defines a groove 18 in the first surface 111. The groove 18 is substantially rectangular and runs through the third surface 113.

The case 11 also defines a first slot 12 and a second slot 13 in the first surface 111. The first slot 12 and the second slot 13 run along a direction that is substantially parallel with the third surface 113. The first slot 12 and the second slot 13 are aligned with the groove in a width direction of the case 11 (i.e., a direction that is parallel with the first surface 111 and the third surface 113). The first slot 12 is positioned between the groove 18 and the second slot 13.

The first slot 12 has a triangular cross-section perpendicular to the first surface 111 and the third surface 113, and forms a first total internal reflective (TIR) surface 121 adjacent to the third surface 113 and connecting the first surface 111, and a second TIR surface 122 connecting the first TIR surface 121 and the first surface 111. The first TIR surface 121 is about 45 degrees tilted with respect to the third surface 113, and the second TIR surface 122 is about −45 degrees tilted with respect to the third surface 113. A line L2 passes through an intersection line of the first TIR surface 121 and the second TIR surface 122 and is perpendicular to the first surface 111.

The second slot 13 has a triangular cross-section perpendicular to the first surface 111 and the third surface 113 and forms a third TIR surface 131 adjacent to the third surface 113 and connecting the first surface 111. The third TIR surface 131 is parallel to the first TIR surface 121.

The case 11 includes a number of first lenses 14 and a number of second lenses 15.

The first lenses 14 are formed on the second surface 112 and arranged along a line that is substantially parallel with the third surface 113. An optical axis L1 of each of the first lenses 14 pass the first TIR surface 111, parallel with and closing to the line L2.

The second lenses 15 are formed on a first side surface 182 of the groove 18 parallel with the third surface 113 and arranged along a line that is substantially parallel with the first surface 111. The second lenses 15 are optically aligned with the first lenses 14 through the first TIR surface 121.

The case 11 also includes a positioning block 16 protruding up from a bottom surface 181 of the groove 18. The positioning block 16 is rectangular and connecting two parallel second side surfaces 183 of the groove 18 and the third surface 113. The positioning block 16 includes a top surface 161 facing away from the bottom surface 181 of the groove 18 and defines a number of positioning slots 162 in the top surface 161. The positioning slots 162 run through the positioning block 16 along a direction that is substantially perpendicular to the third surface 113 and aligned with the second lenses 15.

The case 11 includes a supporting protrusion 17 protruding up from the second surface 112. The supporting protrusion 17 is strip-shaped and surrounds the first lenses 14. A height of the supporting protrusion 17 is greater than a total height of the first lenses 14 and the light emitter 30.

In assembly, the case 11, the light emitters 30, and the photo detectors 40 are positioned on the substrate 20. The supporting protrusion 17 supports the case 11 on the substrate 20. The light emitters 30, such as laser diodes, and the photo detector 40 such as photo diode are electrically connected to the substrate 20. The light emitters 30 are aligned with the first lenses 14. The photo detector 40 are optically aligned with the light emitters 30 through the third TIR surface 131 and the second TIR surface 122. The optical fibers 50 are positioned by the positioning slots 162 and aligned with the second lenses 15.

In operation, the substrate 20, such as a printed circuit board, drives the light emitters 30 to emit light beams. Each light beam is converged by the associated first lens 14 to the first slot 12, and split by the first TIR surface 121 and the second TIR surface 122. A major part of the light beam is reflected by the first TIR surface 121 to the associated second lens 15 and optical fiber 50 for transmitting data. A minor part of the light beam is reflected by the second TIR surface 122 and then reflected by the third TIR surface 131 to the associated photo detector 40. The substrate 20 processes an output of the photo detectors 40 to determine whether intensive and stability of the light beams is sufficient.

The number of the light emitters 30, the first lenses 14, the second lenses 15, the positioning slots 162, the optical fibers 50, and the photo detectors 40 are all four in the embodiment, but can be other numbers such as one in other embodiments depending on need.

It will be understood that the above particular embodiments are shown and described by way of illustration only. The principles and the features of the present disclosure may be employed in various and numerous embodiment thereof without departing from the scope of the disclosure as claimed.

The above-described embodiments illustrate the possible scope of the disclosure but do not restrict the scope of the disclosure.

What is claimed is:

1. An optical connector, comprising:
   a substrate;
   a light emitter positioned on the substrate;
   a case positioned on the substrate and covering the light emitter, the case comprising a first surface, a second surface, and a third surface, the second surface facing the light emitter and opposing the first surface, the third surface perpendicularly connecting the first surface to the second surface, the case comprising a first lens formed on the second surface and aligned with the light emitter, the case defining a first slot, a second slot, and a groove in the first surface, all of the first slot, the second slot, and the groove extending along a direction that is parallel with the third surface, the second slot and the groove being positioned at two sides of the first slot, the first slot forming a first total internal reflection (TIR) surface and a second TIR surface both facing toward the light emitter, the second slot forming a third TIR surface, the groove running through the third surface and forming a side surface parallel with the third surface, the case comprising a second lens formed on the side surface and optically aligned with the first lens through the first TIR surface;
   an optical fiber positioned in the groove and optically aligned with the second lens; and
   a photo detector positioned on the substrate, the photo detector being optically aligned with and optically coupled with the light emitter through the third TIR surface, the second TIR surface, and the first lens;
   wherein
   when the light emitter emits a light beam, the light beam is converged by the first lens to the first slot, and then split by the first TIR surface and the second TIR surface into two parts, a major part of the light beam is reflected by the first TIR surface to the second lens and the optical fiber for transmitting data, and a minor part of the light beam is reflected by the second TIR surface and then reflected by the third TIR surface to the photo detector.

2. The optical connector of claim 1, wherein the substrate is a printed circuit board, the light emitter and the photo detector are electrically connected to the substrate, and the substrate is configured to drive the light emitter to emit the light beam and to process output of the photo detector to determine intensive and stability of light incident on the photo detector.

3. The optical connector of claim 1, wherein the light emitter is a laser diode.

4. The optical connector of claim 1, further comprising another light emitters, photo detectors, and optical fibers, wherein the case comprises another first lenses and second lenses, all of the light emitters are positioned on the substrate and arranged along a direction that is substantially parallel with the third surface, all of the first lenses are formed on the second surface and aligned with the light emitters, all of the second lenses are formed on the side surface, arranged along a direction that is substantially parallel with the first surface, and optically aligned with the first lenses via the first TIR surface, all of the optical fibers are positioned in the groove and aligned with the second lenses, and all of the photo detectors are positioned on the substrate, arranged along a direction that is parallel with the third surface, and optically aligned with and optically coupled with the first lenses through the second TIR surface and the third TIR surface.

5. The optical connector of claim 1, wherein the first TIR surface is adjacent to the groove, connects the first surface to the second TIR surface, and inclines with respect to the first surface at about 45 degrees.

6. The optical connector of claim 5, wherein the second TIR surface connects the first TIR surface to the first surface and inclines with respect to the first surface at about 45 degrees and is perpendicular to the first TIR surface.

7. The optical connector of claim 1, wherein the third TIR surface is adjacent to the second TIR surface, connects the first surface, and inclines with respect to the first surface at about 45 degrees.

8. The optical connector of claim 1, wherein an optical axis of the first lens passes the first TIR surface and offsets an intersection line of the first TIR surface and the second TIR surface.

9. The optical connector claim 8, wherein the optical axis is close to a line passing through the intersection line of the first TIR surface and the second TIR surface and perpendicular to the first surface.

10. The optical connector of claim 1, wherein the case comprises a positioning block protruding up from a bottom surface of the groove, the positioning block comprises a top surface facing away from the bottom surface and defines a positioning slot in the top surface, and the positioning slot runs through the positioning block along a direction that is perpendicular to the third surface and is aligned with the second lens, and the optical fiber is received in the positioning slot.

11. The optical connector of claim 1, wherein the case comprises a supporting protrusion protruding up from the second surface, the supporting protrusion is strip-shaped and surrounds the first lens, a height of the supporting protrusion is larger than a total height of the first lens and the light emitter, and the supporting protrusion supports the case on the substrate.

* * * * *